US012663344B2

(12) United States Patent
Liu et al.

(10) Patent No.: US 12,663,344 B2
(45) Date of Patent: Jun. 23, 2026

(54) SMEAR APPARATUS, SAMPLE LOADING MECHANISM AND METHOD

(71) Applicant: Shenzhen Mindray Bio-Medical Electronics Co., Ltd., Shenzhen (CN)

(72) Inventors: Yinming Liu, Shenzhen (CN); Jin Teng, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 809 days.

(21) Appl. No.: 17/745,716

(22) Filed: May 16, 2022

(65) Prior Publication Data

US 2022/0276137 A1    Sep. 1, 2022

Related U.S. Application Data

(63) Continuation of application No. PCT/CN2019/119185, filed on Nov. 18, 2019.

(51) Int. Cl.
*G01N 1/00*      (2006.01)
*G01N 1/28*      (2006.01)

(52) U.S. Cl.
CPC .................................. *G01N 1/2813* (2013.01)

(58) Field of Classification Search
None
See application file for complete search history.

(56) References Cited

U.S. PATENT DOCUMENTS

| | | | | |
|---|---|---|---|---|
| 4,737,344 A | * | 4/1988 | Koizumi ............... | B01L 3/0262 |
| | | | | 422/930 |
| 2002/0024026 A1 | | 2/2002 | Kaushikkar | |
| 2002/0142483 A1 | | 10/2002 | Yao et al. | |
| 2005/0244302 A1 | | 11/2005 | Overbeck et al. | |
| 2016/0011083 A1 | | 1/2016 | Barnes et al. | |
| 2018/0059132 A1 | | 3/2018 | Christey et al. | |
| 2018/0067020 A1 | | 3/2018 | Le Comte | |
| 2020/0080998 A1 | * | 3/2020 | Zhu ...................... | G01N 35/025 |

FOREIGN PATENT DOCUMENTS

| | | |
|---|---|---|
| CN | 1302904 A | 7/2001 |
| CN | 2919255 Y | 7/2007 |
| CN | 101086496 A | 12/2007 |

(Continued)

OTHER PUBLICATIONS

European Patent Office, European Application No. 19953448.8, Extended European Search Report dated Oct. 14, 2022, 11 pages.

(Continued)

*Primary Examiner* — Jyoti Mutreja
(74) *Attorney, Agent, or Firm* — Syncoda LLC; Feng Ma

(57) ABSTRACT

A sample loading mechanism and method applicable to a smear apparatus, and a smear apparatus are provided. The sample loading mechanism includes: a blood dripping needle, a transfer device and a control device. The blood dripping needle is connected with the transfer device which is configured to drive the blood dripping needle to move relative to a slide. When the blood dripping needle is in contact with the slide, the control device is configured to control the transfer device to stop the blood dripping needle from moving towards the slide, and to control the blood dripping needle to drip a blood sample onto the slide.

20 Claims, 15 Drawing Sheets

(56) References Cited

FOREIGN PATENT DOCUMENTS

| CN | 105092323 | A | 11/2015 |
| CN | 105115797 | | 12/2015 |
| CN | 105960584 | A | 9/2016 |
| CN | 205861711 | U | 1/2017 |
| EP | 3239715 | A1 | 11/2017 |
| JP | S61265572 | A | 11/1986 |
| JP | 2001046062 | A | 2/2001 |
| JP | 2002098707 | A | 4/2002 |
| JP | 2003166911 | A | 6/2003 |
| JP | 2007139704 | A | 6/2007 |
| JP | 2007218877 | A | 8/2007 |
| JP | 2008190926 | A | 8/2008 |
| WO | 199936760 | A | 7/1999 |
| WO | 2002055199 | A2 | 7/2002 |
| WO | 2015165019 | A1 | 11/2015 |

OTHER PUBLICATIONS

Supplementary European Search Report in the European application No. 25218890.9, mailed on Apr. 13, 2026.

* cited by examiner

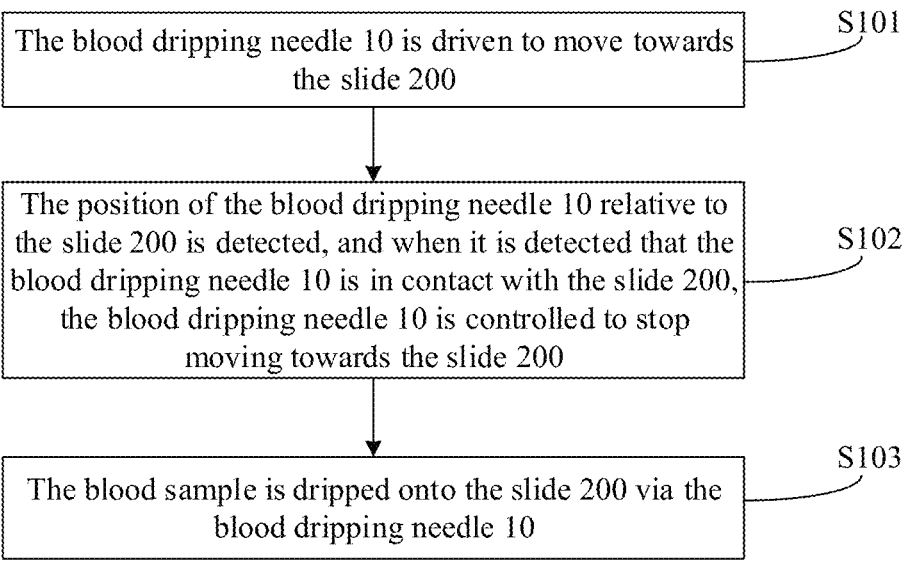

The blood dripping needle 10 is driven to move towards the slide 200                    S101

The position of the blood dripping needle 10 relative to the slide 200 is detected, and when it is detected that the blood dripping needle 10 is in contact with the slide 200, the blood dripping needle 10 is controlled to stop moving towards the slide 200                    S102

The blood sample is dripped onto the slide 200 via the blood dripping needle 10                    S103

FIG. 10

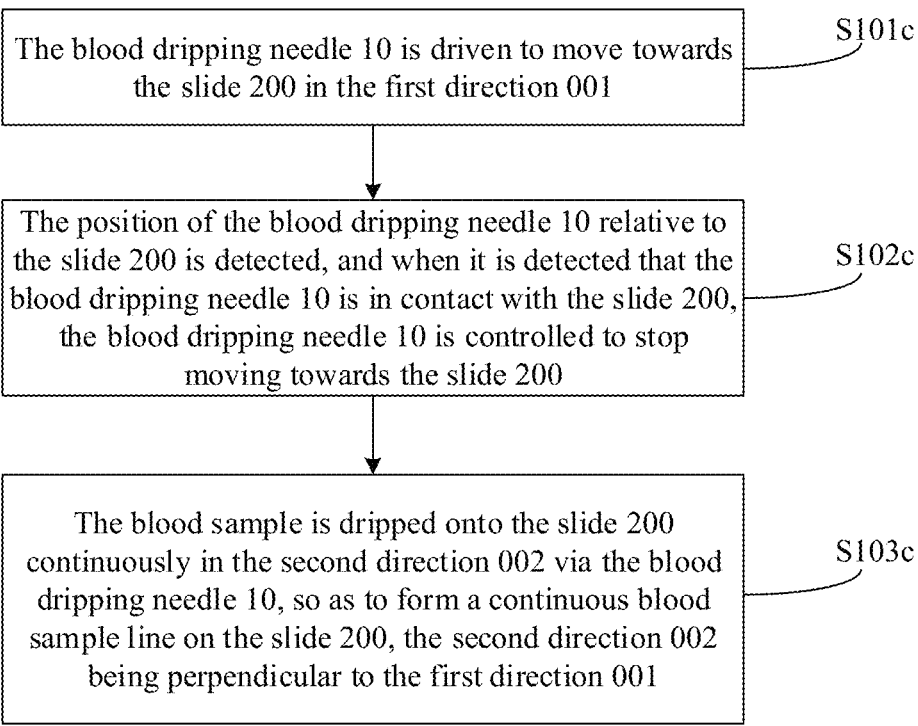

The blood dripping needle 10 is driven to move towards the slide 200 in the first direction 001 — S101c The position of the blood dripping needle 10 relative to the slide 200 is detected, and when it is detected that the blood dripping needle 10 is in contact with the slide 200, the blood dripping needle 10 is controlled to stop moving towards the slide 200 — S102c The blood sample is dripped onto the slide 200 continuously in the second direction 002 via the blood dripping needle 10, so as to form a continuous blood sample line on the slide 200, the second direction 002 being perpendicular to the first direction 001 — S103c

Storage device

Processor        401

Computer-readable storage medium

SMEAR APPARATUS, SAMPLE LOADING MECHANISM AND METHOD

CROSS-REFERENCE TO RELATED APPLICATION

This is a continuation of International Patent Application No. PCT/CN2019/119185, filed on Nov. 18, 2019, the disclosure of which is hereby incorporated by reference in its entirety.

TECHNICAL FIELD

The application relates to the technical field of medical detection, and in particular to a sample loading mechanism applicable to a smear apparatus, a sample loading method for a smear apparatus, a smear apparatus including the sample loading mechanism, and a computer-readable storage medium.

BACKGROUND

Currently, a smear apparatus generally uses a non-contact blood dripping way to load a blood sample onto a slide. After dropping to a preset height, a blood dripping needle for blood dripping forms a certain clearance with the slide and starts a blood dripping operation. The clearance serves as a blood flow channel through which the blood sample can flow and be loaded onto the slide. Especially for some embodiments in which the blood dripping needle needs to move further relative to the slide and keeps blood dripping, the non-contact blood dripping way can form a blood line on the slide, thereby facilitating smearing the blood sample to form a blood film in a subsequent smearing process.

SUMMARY

The disclosure provides a sample loading mechanism to reduce the requirement on the control accuracy of positioning the blood dripping needle. The disclosure also relates to a smear apparatus including the sample loading mechanism and a sample loading method for the smear apparatus.

In a first aspect, a sample loading mechanism applicable to a smear apparatus is provided by the disclosure. The sample loading mechanism includes a blood dripping needle, a transfer device and a control device. The blood dripping needle is connected with the transfer device which is configured to drive the blood dripping needle to move relative to a slide.

When the blood dripping needle is in contact with the slide, the control device is configured to control the transfer device to stop the blood dripping needle from moving towards the slide, and to control the blood dripping needle to drip a blood sample onto the slide.

In a second aspect, the disclosure relates to a smear apparatus, which includes a slide loading mechanism, the sample loading mechanism in the first aspect, a smear mechanism, a drying mechanism and a staining mechanism.

The slide loading mechanism is configured to move a slide to the smear apparatus.

The sample loading mechanism is configured to load a blood sample onto the slide.

The smear mechanism is configured to smear the blood sample on the slide to form a blood film.

The drying mechanism is configured to dry the blood film on the slide.

The staining mechanism is configured to stain the slide.

In a third aspect, the disclosure relates to a sample loading method for a smear apparatus, which includes the following operations.

A blood dripping needle is driven to move towards a slide.

When the blood dripping needle is in contact with the slide, the blood dripping needle is controlled to stop from moving towards the slide.

A blood sample is dripped onto the slide via the blood dripping needle.

BRIEF DESCRIPTION OF THE DRAWINGS

In order to more clearly illustrate technical solutions in embodiments of the present invention or the related art, the accompanying drawings needed in description of the embodiments or the related art are simply introduced below. It is apparent that the accompanying drawings in the following description are only some embodiments of the present invention, and for the ordinary skill in the art, some other accompanying drawings can also be obtained according to these without creative efforts.

FIG. 10 illustrates a flowchart of a sample loading method for a smear apparatus according to an embodiment of the disclosure.

FIG. 13 illustrates a flowchart of a sample loading method for a smear apparatus according to another embodiment of the disclosure.

DETAILED DESCRIPTION

Figure 1:
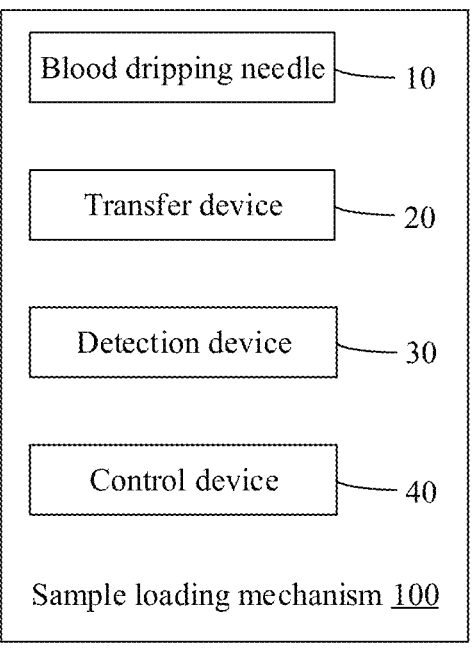
FIG. 1 illustrates a schematic block diagram of a sample loading mechanism according to an embodiment of the disclosure.

The technical solutions in the embodiments of the disclosure will be clearly and fully described below in combination with the drawings in the embodiments of the disclosure. It is apparent that the described embodiments are not all embodiments but part of embodiments of the disclosure. On the basis of the embodiments of the disclosure, all other embodiments obtained by those skilled in the art without creative efforts shall fall within the scope of protection of the disclosure.

The serial numbers of components, such as "first" and "second", are only used to distinguish the described objects and do not have any sequential or technical meaning. The terms "connection" and "joint" in the disclosure include direct and indirect connection (joint) unless otherwise specified. In the descriptions of the disclosure, it is to be understood that orientation or position relationships indicated by terms "upper", "lower", "front", "back", "left", "right", "vertical", "horizontal", "top", "bottom", "inner", "outer", "clockwise", "counterclockwise" and the like are orientation or position relationships shown in the drawings, which are only adopted to describe the disclosure conveniently and simplify descriptions, and do not indicate or imply that indicated devices or components must be in specific orientations or structured and operated in specific orientations, and therefore should not be construed to limit the disclosure.

In the disclosure, unless otherwise definitely specified and limited, the state that a first feature is "above" or "below" a second feature may include that the first and second features directly contact and may also include that the first and second features contact through another feature therebetween rather than directly contact. Moreover, the state that the first feature is "above", "over" and "on" the second feature may be that the first feature is over or above the second feature or only represents that a horizontal height of the first feature is larger than that of the second feature. The state that the first feature is "below", "under" and "beneath" the second feature may be that the first feature is under or below the second feature or only represents that the horizontal height of the first feature is smaller than that of the second feature.

Currently, a smear apparatus generally uses a non-contact blood dripping way to load a blood sample onto a slide. The non-contact blood dripping scheme has a high requirement on a positioning accuracy of the blood dripping needle. If the clearance between the blood dripping needle and the slide is too big, it is easy to cause a sputtering of the blood sample or an offset of the loading position. If the clearance between the blood dripping needle and the slide is too small, part of the blood sample is easily left on the blood dripping needle to be taken away. Meanwhile, the slides for carrying the blood sample usually vary widely in thickness. These factors increase the difficulty of positioning the blood dripping needle, thus making a structure of the blood dripping needle relatively complicated and making a manufacturing cost higher.

The disclosure provides a sample loading mechanism to reduce the requirement on the control accuracy of positioning the blood dripping needle. Referring to FIG. 1, a sample loading mechanism 100 applicable to a smear apparatus in the disclosure is configured to load a blood sample onto a slide 200. In some embodiments, the sample loading mechanism 100 is further configured to extract the blood sample from a sample container. The sample loading mechanism 100 includes a blood dripping needle 10, a transfer device 20, a detection device 30 and a control device 40. The blood dripping needle 10 is configured to output a blood sample to the slide 200 at a preset position in the smear apparatus. The preset position may also be interpreted as the preset position of the blood dripping needle 10 relative to the slide 200. The transfer device 20 may move inside the smear apparatus. The transfer device 20 is fixedly connected with the blood dripping needle 10, and is configured to drive the blood dripping needle 10 to move relative to the slide 200 to the preset position. The detection device 30 is configured to detect whether the blood dripping needle reaches the preset position in the process of driving the blood dripping needle 10 to move relative to the slide 200 by the transfer device 20. In an embodiment of the disclosure, the detection device 30 detects whether the blood dripping needle 10 moves to the preset position relative to the slide 200 by detecting whether the blood dripping needle 10 is in contact with the slide 200. It is to be noted that the preset position of the blood dripping needle 10 relative to the slide 200 may be a position where the blood dripping needle 10 is in contact with the slide 200, or a certain position to which the blood dripping needle 10 is driven by the transfer device 20 to move reversely relative to the slide 200 after coming into contact with the slide 200.

The detection device 30 is connected with the control device 40 communicatively. After detecting that the blood dripping needle 10 comes into contact with the slide 200, the detection device 30 sends a detection signal to the control device 40. The control device 40 controls the blood dripping needle 10 to perform a blood dripping operation. It is to be understood that the control device 40 may also be configured to control the transfer device 20 to drive a movement of the blood dripping needle 10 relative to the slide 200. The movement includes a movement of the blood dripping needle 10 towards the slide 200 until contact occurs which is driven by the transfer device 20, and may also include the reverse movement of the blood dripping needle 10 relative to the slide 200 which is further driven by the transfer device 20 after the blood dripping needle 10 comes into contact with the slide 200.

Figure 2:
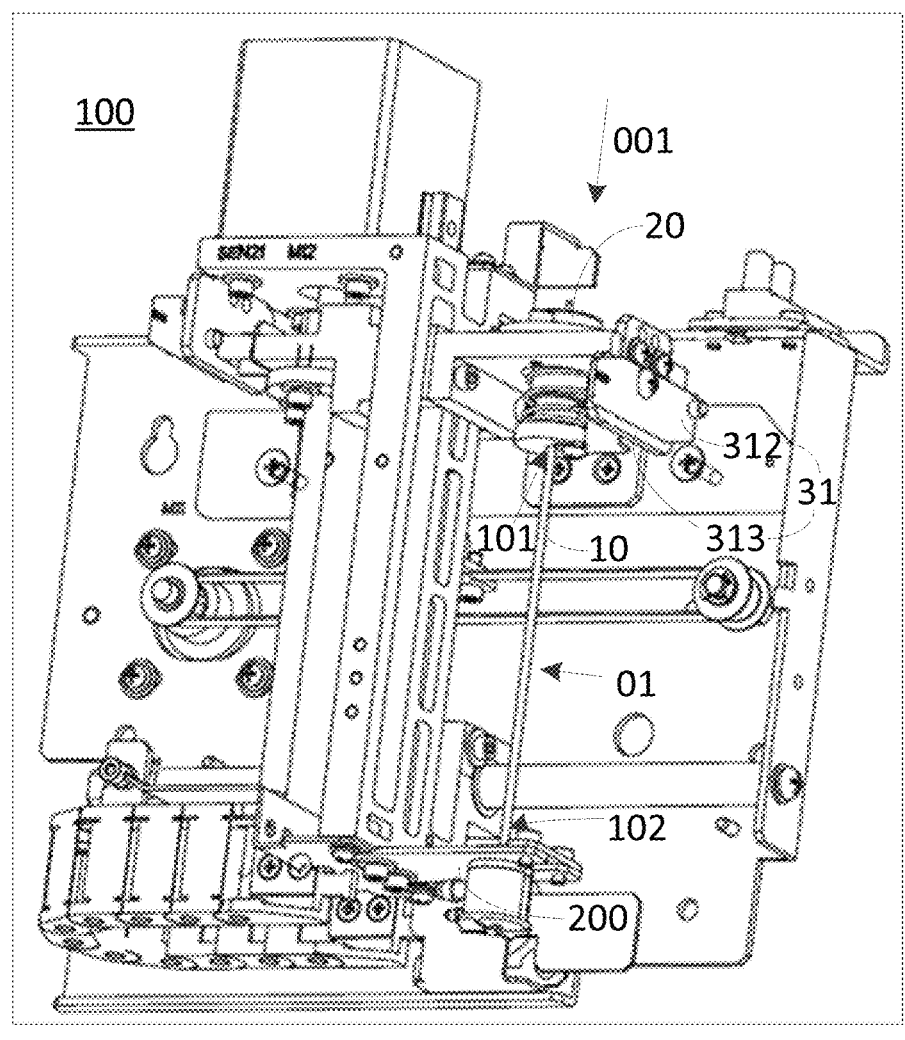
FIG. 2 illustrates a schematic diagram of a sample loading mechanism according to an embodiment of the disclosure.

Looking specifically at FIG. 2. Before the transfer device 20 drives the blood dripping needle 10 to move towards the slide 200, the blood dripping needle 10 is at an initial position inside the smear apparatus. The initial position of the blood dripping needle 10 is defined as a blood dripping position 01. The blood dripping needle 10 at the blood dripping position 01 and the slide 200 are arranged in a first direction 001. The control device 40 controls the transfer device 20 to drive the blood dripping needle 10 to move from the blood dripping position 01 towards the slide 200 in the first direction 001. Generally, the first direction 001 is a vertical direction, that is, when the blood dripping needle 10 is at the blood dripping position 01, it is directly above the slide 200. In other embodiments, based on a difference of an internal structure of the smear apparatus, the blood dripping needle 10 at the blood dripping position 01 may also be obliquely above the slide 200. The detection device 30 detects whether there is contact between the blood dripping needle 10 and the slide 200 when the transfer device 20 drives the blood dripping needle 10 to move in the first direction 001. Once the contact is detected, the detection device 30 sends a detection signal to the control device 40, and the control device 40 controls the transfer device 20 to stop driving the movement of the blood dripping needle 10 towards the slide 200.

In the sample loading mechanism 100 in the disclosure, the detection of the contact between the blood dripping needle 10 and the slide 200 can be used for more accurate control of the relative position between the blood dripping needle 10 and the slide 200 when the blood sample is loaded. A specific operation mode in which the control device 40 subsequently controls the blood dripping needle 10 to load a blood sample onto the slide 200 is not specifically limited in the sample loading mechanism 100 of the disclosure. Generally, in order to load the blood sample in the blood dripping needle 10 onto the slide 200, a blood flow channel should be set aside between the blood dripping needle 10 and the slide 200, and the blood sample is loaded from the blood dripping needle 10 onto the slide 200 through the blood flow channel. In the sample loading mechanism 100 of the disclosure, the blood flow channel may be set as a clearance between the blood dripping needle 10 and the slide 200 or as a gap of the blood dripping needle 10.

It is to be understood that when the blood flow channel is the clearance between the blood dripping needle 10 and the slide 200, an action of the sample loading mechanism 100 of the disclosure in the actual sample loading process is similar to an action of letting blood drip to load sample in the related art, that is, the blood dripping needle 10 suspends relative to the slide 200, and lets blood drip towards the slide 200 in a non-contact way. The blood dripping needle 10 is directly above the slide 200, and a clearance is formed between the blood dripping needle and the slide in the vertical direction. The blood sample output by the blood dripping needle 10 drips onto the slide 200 under gravity.

Figure 3:
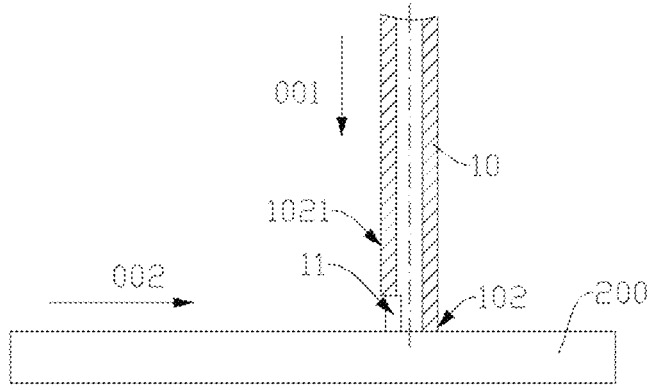
FIG. 3 illustrates a section view of a blood dripping needle in a sample loading mechanism according to an embodiment of the disclosure.

Referring to FIG. 3 for another embodiment, the blood flow channel is the gap set on the blood dripping needle 10, and the blood sample output by the blood dripping needle 10 is loaded onto the slide 200 through the gap 11. Specifically, the blood dripping needle 10 includes a connection end 101 and a blood dripping end 102 relative to each other in the first direction 001. The connection end 101 is connected with the transfer device 20. The blood dripping end 102 of the blood dripping needle 10 is configured to contact with the slide 200. The blood dripping end 102 is also configured to output the blood sample to the slide 200. The blood dripping needle 10 is a hollow structure. The blood sample is sent from the connection end 101 to the blood dripping end 102 and then output from the blood dripping end 102. The gap 11 extends in a second direction 002 from a geometric center of the blood dripping end 102, and penetrates at least one side of a lateral wall 1021 of the blood dripping end 102. The second direction 002 is perpendicular to the first direction 001. When flowing from the connection end 101 to the blood dripping end 102, the blood sample may flow to the slide 200 through the gap 11, so as to be loaded onto the slide 200.

It is to be understood that the first direction 001 is usually the vertical direction, and the second direction 002 is usually the horizontal direction perpendicular to the vertical direction, that is, the gap 11 penetrates at least one side of the lateral wall 1021 of the blood dripping end 102 in the horizontal direction. With the setting of the gap 11, the blood dripping needle 10 may keep contact with the slide 200 during blood dripping, and the blood sample is loaded from the hollow blood dripping needle 10 onto the slide 200 through the gap 11. It is to be noted that, in the embodiment of FIG. 3, the blood dripping needle 10 may keep contact with the slide 200 during blood dripping, and the blood sample flows from the blood dripping needle 10 onto the slide 200 by using the gap 11 as the main channel, to achieve a contact-type blood dripping operation; the blood dripping needle 10 may also form a clearance with the slide 200 in the vertical direction during blood dripping, and the gap 11 assists a smooth outflow of the blood sample, to achieve a non-contact type blood dripping operation.

For the embodiment in which the blood flow channel is the clearance between the blood dripping needle 10 and the slide 200, after receiving the detection signal sent by the detection device 30, the control device 40 may control the transfer device 20 to drive the blood dripping needle 10 to move reversely relative to the slide 200 by a predetermined distance and then start the blood dripping operation after forming the clearance with the slide 200. It is to be understood that, compared with the related art in which the blood dripping needle 10 is directly controlled to drop to the preset height for blood dripping, the sample loading mechanism 100 of the disclosure can eliminate a height difference of the clearance caused by an uneven thickness of the slide 200 through the actual contact between the blood dripping needle 10 and the slide 200, thereby ensuring the clearance precision between the blood dripping needle 10 and the slide 200. The predetermined distance that the blood dripping needle 10 moves reversely after coming into contact with the slide 200 is far less than a movement distance of the blood dripping needle 10 dropping from the blood dripping position 01 to the preset height, so a requirement on a control precision of the control device 40 is reduced accordingly. Compared with the existing control mode in which the blood dripping needle is precisely controlled to drop to the preset height, the sample loading mechanism 100 of the disclosure can appropriately reduce the control precision of the control device 40 without the loss of the actual clearance precision, thereby saving the cost.

For the embodiment in which the blood flow channel is the gap 11, after detecting the contact between the blood dripping needle 10 and the slide 200 through the detection device 30, the control device 40 may directly control the blood dripping needle 10 to perform the blood dripping operation without adjusting the height of the blood dripping needle 10 relative to the slide 200. The contact-type blood dripping operation can also eliminate a system error of the sample loading mechanism 100 caused by the uneven thickness of the slide 200, and can further skip the step that the control device 40 controls the blood dripping needle 10 to move relative to the slide 200 to form a clearance. Therefore, there is no need to consider an error in the step, thereby further improving a system accuracy of the sample loading mechanism 100.

Therefore, with the control mode of the sample loading mechanism 100 of the disclosure in which the blood dripping operation is performed after the detection device 30 detects the contact between the blood dripping needle 10 and the slide 200, the control precision of the sample loading mechanism 100 can be improved no matter whether the sample loading mechanism 100 adopts subsequently the contact-type blood dripping operation or the non-contact type blood dripping operation, and the thickness difference between different slides 200 can be adapted. In this way, the sample loading mechanism 100 can ensure the accuracy of a blood sample loading operation with relatively low requirement on the control precision, thus saving the manufacturing cost.

In the related art, there are many ways to detect the contact between the blood dripping needle 10 and the slide 200, for example, using a distance sensor or proximity sensor. In an embodiment, a pressure detection device 31 is used as the detection device 30 for detection. The pressure detection device 31 determines whether the blood dripping needle 10 comes into contact with the slide 200 by detecting a change of a pressure of the blood dripping needle 10 or the slide 200. That is, after the blood dripping needle 10 moves to contact with the slide 200, a mutual extrusion between the blood dripping needle 10 and the slide 200 causes the pressure detection device 31 to detect the change of the pressure of the blood dripping needle 10 or the slide 200, so as to detect that the blood dripping needle 10 comes into contact with the slide 200.

In an embodiment, in order to avoid the damage of the blood dripping needle 10 or the slide 200 caused by the excessive pressure between them, the pressure detection device 31 further includes an elastic connection device 311. The elastic connection device 311 is arranged between the connection end of the blood dripping needle 10 and the transfer device 20, or between the slide 200 and a base 201 holding the slide 200. When the transfer device 20 drives the blood dripping needle 10 to move towards and contact with the slide 200, the blood dripping needle 10 or the slide 200 can squeeze the elastic connection device 311 under the pressure generated by the contact, and the elastic connection device 311 reduces the pressure between the blood dripping needle 10 and the slide 200 through its own elastic deformation, thus avoiding the blood dripping needle 10 or the slide 200 from being damaged. It is to be understood that the elastic deformation of the elastic connection device 311 extends along the first direction 001.

Correspondingly, the pressure detection device 31 further includes a sensing device 312 that can be triggered when the elastic deformation occurs in the elastic connection device 311. The sensing device 312 and the elastic connection device 311 are both arranged on a side of the blood dripping needle 10 or both arranged on a side of the slide 200. The sensing device 312 detects whether the blood dripping needle 10 comes into contact with the slide 200 by sensing a displacement of the blood dripping needle 10 relative to the transfer device 20 or a displacement of the slide 200 relative to the base 201.

Figure 4:
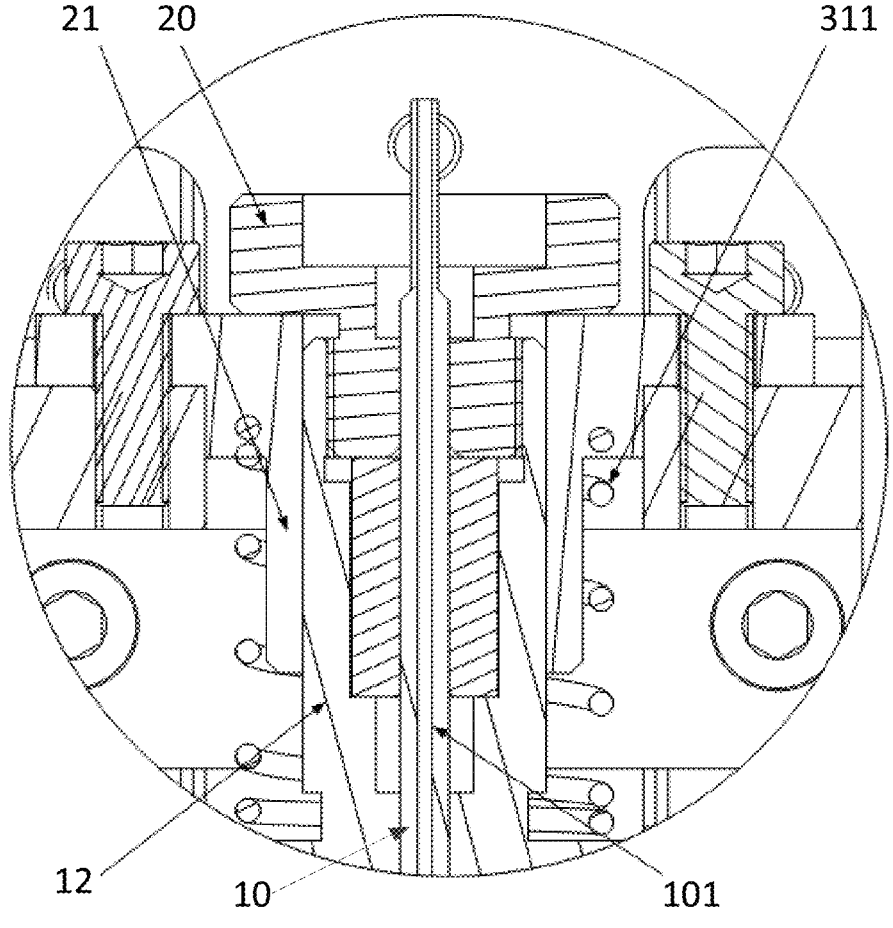
FIG. 4 illustrates a schematic diagram of a detection device in a sample loading mechanism according to an embodiment of the disclosure.

In combination with the embodiments of FIG. 3 and FIG. 4, the elastic connection device 311 is connected between the blood dripping needle 10 and the transfer device 20. A connection position where the connection end 101 of the blood dripping needle 10 is connected with the elastic connection device 311 is called a first connection position, and a connection position where the transfer device 20 is connected with the elastic connection device 311 is called a second connection position. The sensing device 312 is arranged at one of the first connection position and the second connection position, and the other of the first connection position and the second connection position is provided with a triggering component 313 for triggering the sensing device 312. After the transfer device 20 drives the blood dripping needle 10 to come into contact with the slide 200, the blood dripping needle 10 compresses the elastic connection device 311 under the pressure, so that the triggering component 313 and the sensing device 312 are close to each other, and then the sensing device 312 is triggered by the triggering component 313 to form a detection signal. After the detection signal is transmitted to the control device 40, the control device 40 controls the transfer device 20 to stop the blood dripping needle 10 from continuing to move towards the slide 200.

In the embodiment of FIG. 4, the sensing device 312 is arranged at the second connection position, that is, the sensing device 312 is fixed on the transfer device 20. The sensing device 312 is implemented by an optocoupler sensor, and correspondingly, the triggering component 313 adopts a baffle that can cover a detection end of the sensing device 313. The triggering component 313 is arranged at the first connection position, that is, the baffle is fixedly connected with the blood dripping needle 10.

In an embodiment, the elastic connection device 311 is a spring. The spring is held between the blood dripping needle

10 and the transfer device 20 in the first direction 001. The position where the transfer device 20 is connected with the connection end 101 is provided with a first fixing column 21 which is sleeved in one end of the spring. The connection end 101 of the blood dripping needle 10 is set as a second fixing column 12 which is sleeved in the other end of the spring. Two ends of the elastic connection device 311 set as a spring are respectively sleeved on the fixed columns, which can improve a stability of the structure of the elastic connection device 311.

Further, the first fixing column 21 and the second fixing column 12 may be sleeved with each other. As illustrated in FIG. 4, the first fixing column 21 is sleeved outside the second fixing column 12. A mutual cooperation between an inner wall of the first fixing column 21 and an outer wall of the second fixing column 12 can further limit the relative position among the blood dripping needle 10, the elastic connection device 311 and a connecting component 24, thereby further improving the stability of the structure of the sample loading mechanism 100.

Figure 5:
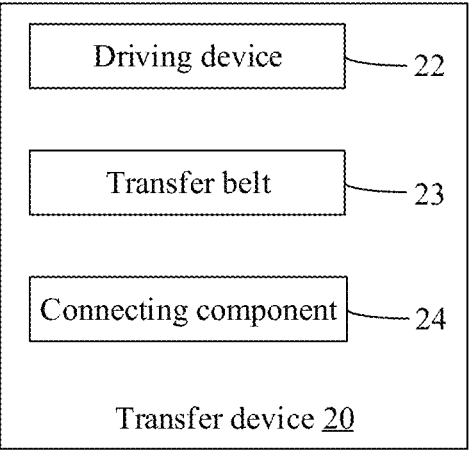
FIG. 5 illustrates a schematic block diagram of a transfer device in a sample loading mechanism according to an embodiment of the disclosure.

Referring to FIG. 5 for an embodiment, the transfer device 20 includes a driving device 22, a transfer belt 23 and a connecting component 24. The transfer belt 23 is connected between the driving device 22 and the connecting component 24. The connecting component 24 is connected with the connection end 101 of the blood dripping needle 10. The driving device 22 drives the movement of the transfer belt 23 to control the movement of the blood dripping needle 10 relative to the slide 200.

Figure 6:
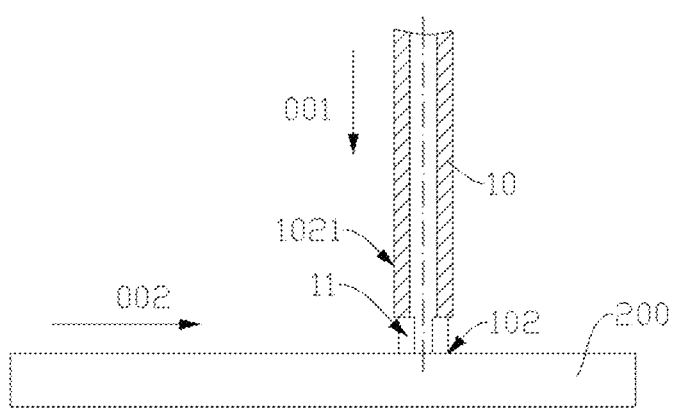
FIG. 6 illustrates a section view of a blood dripping needle in a sample loading mechanism according to another embodiment of the disclosure.

Referring to FIG. 6, as mentioned above, the gap 11 of the blood dripping needle 10 penetrates at least one side of the outer wall 1021 of the blood dripping end 102 in the second direction 002 from the geometric center of the blood dripping end 102. In the embodiment of FIG. 6, the gap 11 completely passes through the blood dripping end 102 in the second direction 002, so that the blood flow channel is formed along the opposite sides of the outer wall 1021 of the blood dripping end 102 in the second direction 002, to form a straight slot. The embodiment in which the gap 11 completely passes through the blood dripping end 102 may further expand the flow area of the blood flow channel, which can ensure that the blood sample is loaded from the blood dripping end 102 to the slide 200 more smoothly no matter whether the blood dripping needle 10 adopts the contact-type or non-contact type blood dripping operation.

Figure 7:
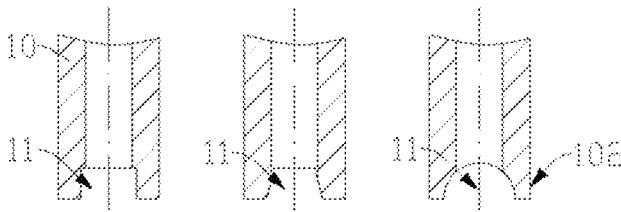
FIG. 7 illustrates a schematic diagram of a blood dripping needle in a sample loading mechanism according to an embodiment of the disclosure.

A cross-section shape of the gap 11 can be seen in FIG. 7. In FIG. 7, the cross-section shape of the gap 11 formed at the blood dripping end 102 may be rectangular, trapezoidal or arc-shaped on a cross section perpendicular to the second direction 002. When the gap 11 has a trapezoidal section, a long side of two parallel sides of the trapezoid is at the end of the blood dripping end 102. When the gap 11 has an arc-shaped section, an arc length of the arc does not exceed an arc length of a semicircle. The above setting can ensure that the closer the gap 11 is to the end of blood dripping end 102 in the first direction 001, the larger the width of its cross-section shape, so as to facilitate the loading of the blood sample onto the slide 200 from the blood dripping end 102 more smoothly.

It is to be understood that, in some embodiments, there may be two or multiple gaps 11, and the multiple gaps 11 may be parallel to each other, and pass through the blood dripping end 102 in the second direction 002 to help blood dripping. The multiple gaps 11 may also form a circular array relative to the geometric center of the blood dripping end 102. For example, two penetrating gaps 11 form an "X-shaped slot" or a "cross-shaped slot" at the blood dripping end 102. All the above ways can expand the area of the blood flow channel of the blood dripping end 102, which helps the blood dripping end 102 to load the blood sample onto the slide 200 more smoothly. On the other hand, in order to prevent the blood dripping end 102 of the blood dripping needle 10, especially the sharp angle formed by the gap 11 on the blood dripping end 102 from scratching an external surface of the slide 200, the blood dripping end 102 may also be rounded.

For a shape of the blood sample loaded onto the slide 200 by the blood dripping needle 10, in an embodiment, the control device 40 controls the blood dripping needle 10 to let blood drip on the slide 200 to form a blood drop and the blood drop on the slide 200 is smeared to form a blood film in the subsequent smearing process. In another embodiment, the control device 40 may also control the transfer device 20 to drive the blood dripping needle 10 to let blood drip while moving in the horizontal direction, so as to form a blood line on the slide 200, and the blood line on the slide 200 is smeared in the direction perpendicular to the blood line to form a blood film in the subsequent smearing process.

For the latter sample loading way, the control device 40 may also control the transfer device 20 to drive the blood dripping needle 10 to move in the second direction 002 to complete the blood dripping operation. The blood line formed in this way also extends in the second direction 002. The second direction 002 is the horizontal direction. When the blood dripping needle 10 adopts the contact-type blood dripping way, that is, when the blood dripping end 102 keeps contact with the slide 200 during blood dripping, because the gap 11 of the blood dripping end 102 also penetrates at least one side of the lateral wall 1021 in the second direction 002, the blood sample can be continuously loaded onto the slide 200 from the gap 11 in the second direction 002, and the blood line that has been loaded onto the slide 200 will not be scraped off from the slide 200 due to the contact between the blood dripping end 102 and the slide 200.

Figure 8:
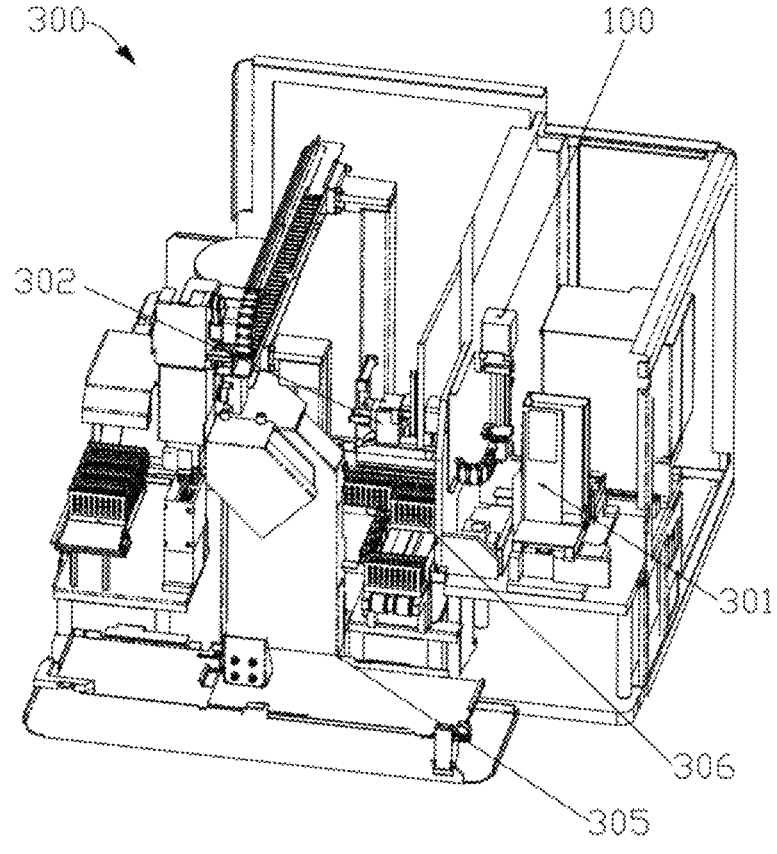
FIG. 8 illustrates a schematic diagram of a smear apparatus according to an embodiment of the disclosure.
Figure 9:
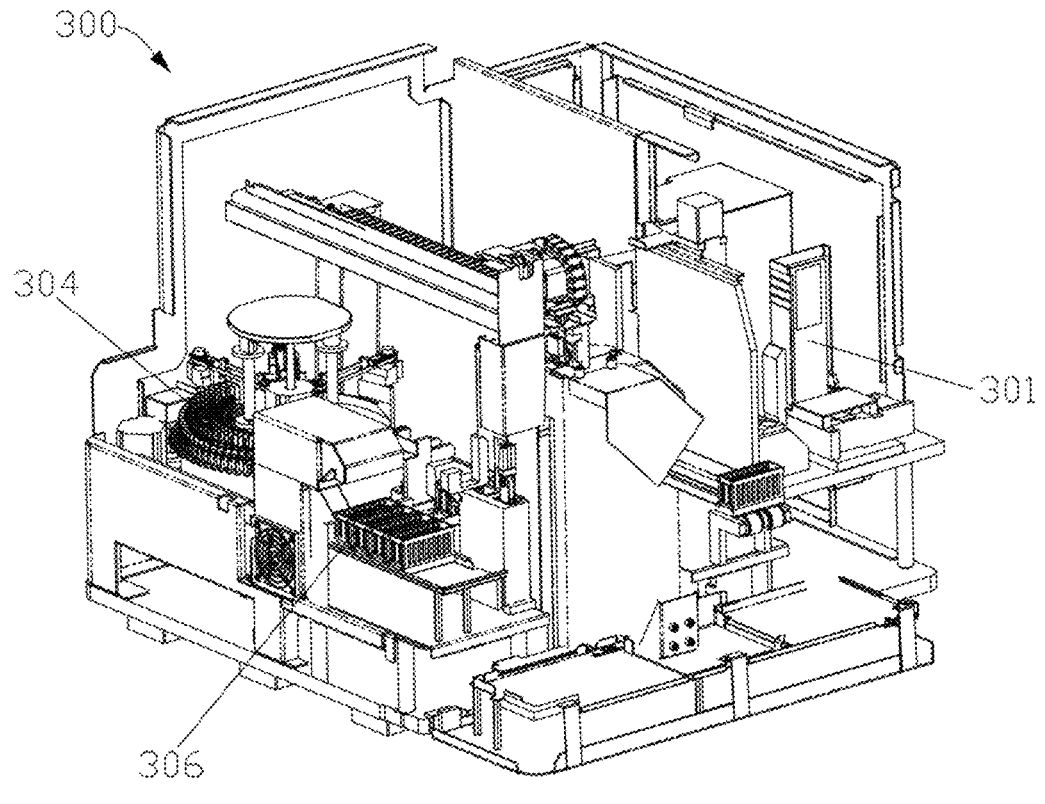
FIG. 9 illustrates a schematic diagram of a smear apparatus from another perspective according to an embodiment of the disclosure.

Referring to FIG. 8 and FIG. 9, the disclosure also relates to a smear apparatus 300. The smear apparatus 300 includes a slide loading mechanism 301, the sample loading mechanism 100, a smear mechanism 302, a drying mechanism 303 and a staining mechanism 304. The slide loading mechanism 301 is configured to load the slide 200 into the smear apparatus 300, so as to facilitate the subsequent processing of the slide 200 by various mechanisms, such as loading sample, pushing slide, drying and staining, etc. The sample loading mechanism 100 is configured to load the blood sample onto the slide 200. The smear mechanism 302 is configured to smear the blood sample on the slide 200 to form a blood film. The drying mechanism 303 is configured to dry the blood film on the slide 200. The staining mechanism 304 is configured to stain the slide 200.

The sample loading mechanism 100 may further be configured to extract the blood sample except loading the blood sample onto the slide 200. In an embodiment, the smear apparatus 300 may also include a sampling mechanism 305 especially for sampling. When extracting the blood sample, the blood sample is mixed firstly, and then the sample loading mechanism 100 or the sampling mechanism 305 draws the sample using the blood dripping needle 10 or a sampling device in the sampling mechanism 305, for example, a sampling needle (which is not shown in the figure). Depending on different blood sample containers, sample drawing may be either puncture sample drawing (the blood sample container has a cover body, and the blood dripping needle 10 or the sampling needle passes through the cover body of the blood sample container) or open sample drawing (the blood sample container is open, and the blood dripping needle 10 or the sampling needle draws the sample directly from the open part). When necessary, the blood sample may also be detected to obtain information and compare the information. It is to be understood that, in the embodiment of using the sampling mechanism 305, after sample drawing, the sampling mechanism 305 transfers the blood sample to the blood dripping needle 10 through a sample transfer channel in the smear apparatus 300, so that the blood dripping needle 10 loads the blood sample onto the slide 200.

In some embodiments, after completing the operation of extracting the slide 200, the slide loading mechanism 301 may also detect the left and right of the slide 200 and clean the slide 200, and then load the slide 200 onto a working line of the smear apparatus 300. The relevant information of the loaded slide 200 may be printed; at the same time, the front and back of the slide 200 are detected. After the blood dripping needle 10 of the sample loading mechanism 100 loads the blood sample onto the slide 200, a smearing operation is performed, and the blood sample is pushed on the slide 200 to form a blood film through the smear mechanism 302. Generally, after the smearing operation is completed, the drying mechanism 303 may be used to dry the blood film on the slide 200 to stabilize the shape of the blood film. In some embodiments, before the blood film is dried, the slide 200 may be driven to turn over to meet a corresponding requirement. In some embodiments, the dried slide 200 may also be detected to determine the degree of drying of the blood film. In some embodiments, the dried slide 200 may also be detected for the smear of the blood film to determine whether the blood film is smeared and whether the smear state meets requirements, and then the slide 200 is stained (through the staining mechanism 304) or directly output (for example, placed in a slide basket 306 for output).

It is to be understood that because the smear apparatus 300 of the disclosure includes the sample loading mechanism 100, the requirement on the control precision of the blood dripping needle 10 in the sample loading process is reduced while the action precision during sample loading is ensured, and the slide 200 carrying the blood film that meets a detection requirement is made. It is to be understood that, when the smear apparatus 300 further uses the sample loading mechanism 100 for sampling, the detection device 20 may determine the contact between the blood dripping needle 10 and the sample container to precisely control the position accuracy of the blood dripping needle 10 in the sampling process, thereby reducing the system error of the smear apparatus 300.

Referring to FIG. 10, the disclosure relates to a sample loading method for a smear apparatus, which may include the following operations.

At S101, the blood dripping needle 10 is driven to move towards the slide 200.

At S102, the position of the blood dripping needle 10 relative to the slide 200 is detected, and when it is detected that the blood dripping needle 10 is in contact with the slide 200, the blood dripping needle 10 is controlled to stop from moving towards the slide 200.

At S103, the blood sample is loaded onto the slide 200 through the blood dripping needle 10.

The specific content is similar to the principle of the sample loading mechanism 100. In the sample loading method for a smear apparatus of the disclosure, the blood dripping needle 10 at the initial blood dripping position 01 is driven to move towards the slide 200, and the position of the blood dripping needle 10 relative to the slide 200 is detected synchronously. The movement of the blood dripping needle 10 is stopped after it is detected that the blood dripping needle 10 is in contact with the slide 200. At this point, the relative position between the blood dripping needle 10 and the slide 200 is not interfered by the uneven thickness of the slide 200, there is no need to control the movement distance of the blood dripping needle 10 precisely, and the contact between the blood dripping needle 10 and the slide 200 may eliminate the error. After it is detected that the blood dripping needle 10 is in contact with the slide 200, both the contact-type and non-contact type blood dripping operations can improve the positioning accuracy of the blood dripping needle 10 relative to the slide 200, thereby ensuring the blood sample to be loaded onto the slide 200 smoothly.

Both the movement of the blood dripping needle 10 towards the slide 200 and the stopping of movement of the blood dripping needle 10 can be controlled by the control device 40 cooperating with the transfer device 20 in the sample loading mechanism 100.

Figure 11:
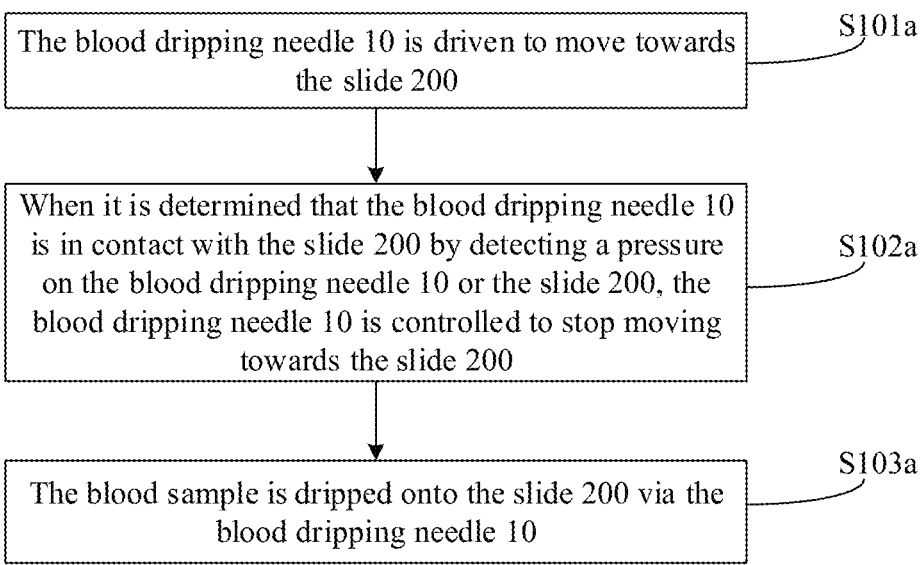
FIG. 11 illustrates a flowchart of a sample loading method for a smear apparatus according to another embodiment of the disclosure.

Referring to FIG. 11 for an embodiment, the operation that the position of the blood dripping needle 10 relative to the slide 200 is detected in S20 may include the operation S102a.

At S102a, it is determined whether the blood dripping needle 10 is in contact with the slide 200 by detecting a pressure received by the blood dripping needle 10 or the slide 200.

Specifically, the pressure received by the blood dripping needle 10 and the slide 200 may be detected by means of a pressure sensor, and whether the blood dripping needle 10 is in contact with the slide 200 is determined. An implementation is the pressure detection device 31 in the sample loading mechanism 100, and whether the blood dripping needle 10 is in contact with the slide 200 is detected by detecting the displacement of the blood dripping needle 10 or the slide 200.

Figure 12:
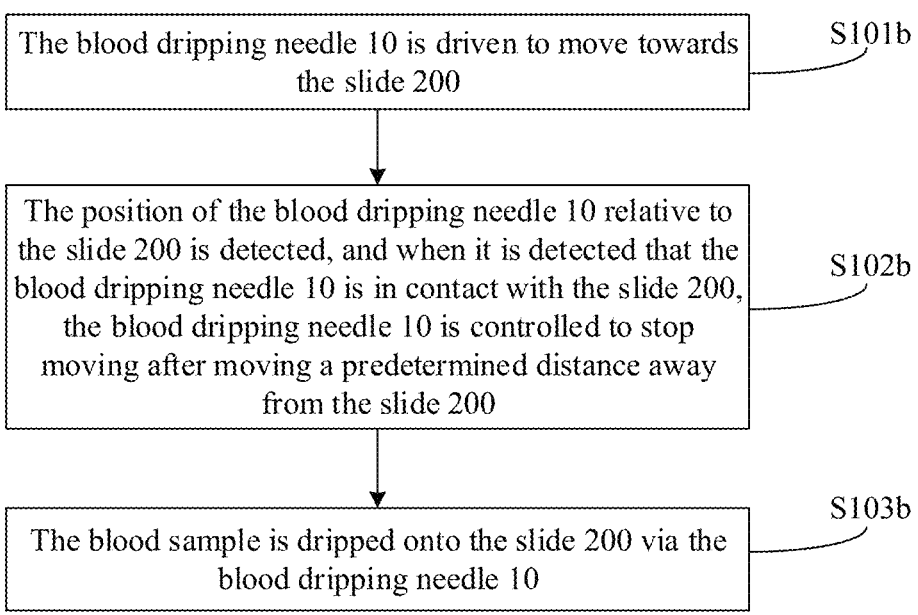
FIG. 12 illustrates a flowchart of a sample loading method for a smear apparatus according to another embodiment of the disclosure.

Referring to FIG. 12 for an embodiment, after the blood dripping needle 10 is in contact with the slide 200, and before the blood dripping needle 10 loads the blood sample onto the slide 200, the method may further include the following operation.

At S102b, the blood dripping needle 10 moves a predetermined distance away from the slide 200.

Specifically, when the sample loading mechanism 100 adopts the non-contact type blood dripping operation, after it is detected that the blood dripping needle 10 comes into contact with the slide 200, it is required to move the blood dripping needle 10 reversely by a predetermined distance, so that a preset clearance is formed between the blood dripping end 102 of the blood dripping needle 10 and the slide 200, and the operation of loading the blood sample is started. It is to be understood that because the demand on the clearance is relatively small, the predetermined distance that the blood dripping needle 10 moves reversely is also small. It is easier to achieve the precision control of a smaller stroke than that of a larger stroke in which the blood dripping needle 10 is driven to move from the blood dripping position 01 to the slide 200, thus reducing the requirement on the precision of the control device 40 and saving the cost.

Referring to FIG. 13 for an embodiment, the operation that the blood dripping needle 10 is driven to move towards the slide 200 in S101 may include the following operation.

At S101c, the blood dripping needle 10 is driven to move towards the slide 200 in the first direction 001.

Then, the operation that the blood sample is loaded onto the slide 200 through the blood dripping needle 10 in S103 may include the following operation.

At S103c, the blood sample is loaded onto the slide 200 continuously through the blood dripping needle 10 in the second direction 002, so as to form a continuous blood sample line on the slide 200. The second direction 002 is perpendicular to the first direction 001.

Specifically, in the embodiment, the blood dripping needle 10 moves in the second direction 002 during blood dripping, so as to load the blood sample onto the slide 200 continuously to form the blood sample line. The continuous blood sample line helps to form the blood film in the subsequent smearing process. At the same time, whether the blood dripping needle 10 is in contact with the slide 200 or not when moving in the second direction 002 is not limited in the sample loading method for a smear apparatus of the disclosure. Because the blood dripping end 102 may be provided with the gap 11, even if the contact-type blood dripping is adopted, the blood sample can be loaded onto the slide 200 continuously according to the sample loading method for a smear apparatus of the disclosure.

Figure 14:
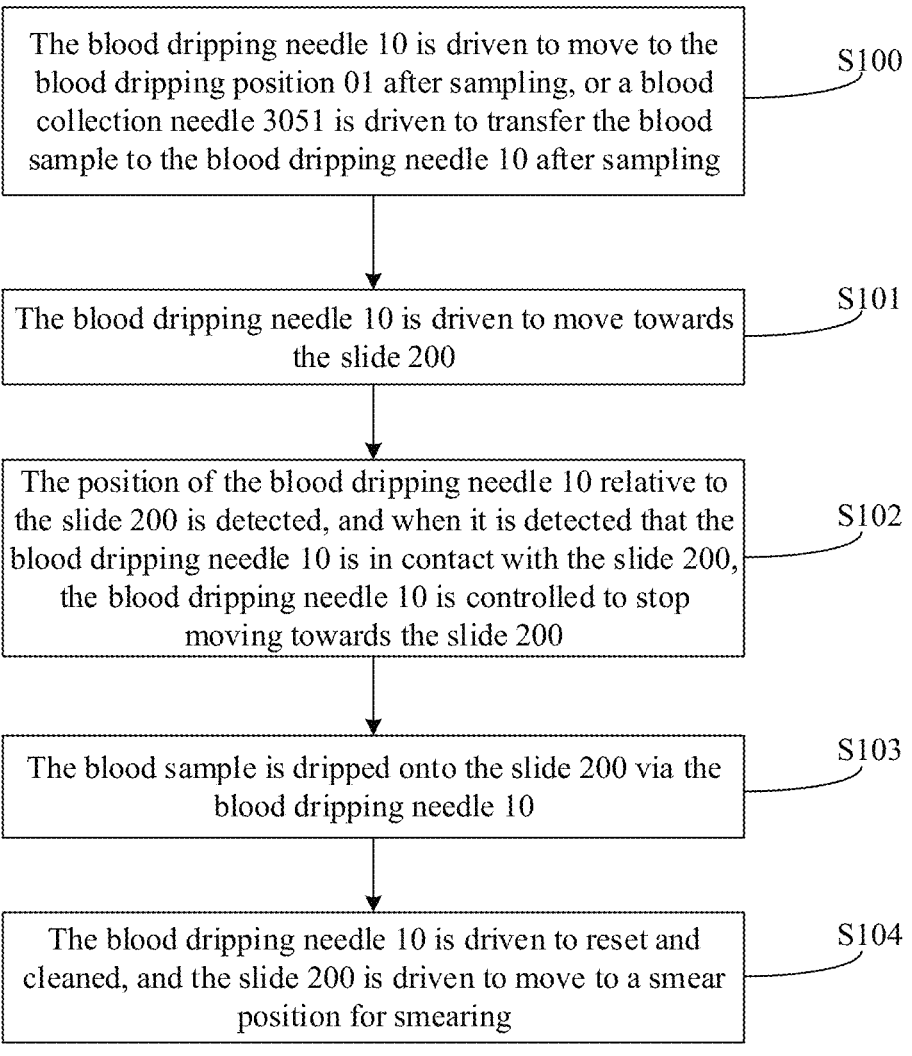
FIG. 14 illustrates a flowchart of a sample loading method for a smear apparatus according to another embodiment of the disclosure.

Referring to FIG. 14 for an embodiment, before the blood dripping needle 10 is driven to move towards the slide 200 in S101, the method may further include the following operation.

At S100, the blood dripping needle 10 is driven to move to the blood dripping position 01 after sampling, the blood dripping position 01 being an initial position before the blood dripping needle 10 moves towards the slide 200, or a blood collection needle 3051 is driven to transfer the blood sample to the blood dripping needle 10 at the blood dripping position 01 after sampling.

The specific content corresponds to the sampling operation of the smear apparatus 300. The smear apparatus 300 can directly drive the blood dripping needle 10 to draw sample and move to the blood dripping position 01 after completing sampling, and then move towards the slide 200 and perform the blood dripping operation after contacting with the slide 200. Alternatively, the smear apparatus 30 may also include a sampling needle especially for sampling. After the sampling needle is driven to draw sample, the blood sample is transferred to the blood dripping needle 10 at the blood dripping position 01 through the sample transfer channel inside the smear apparatus 300, and is loaded onto the slide 200 through the blood dripping needle 10.

It is to be understood that the operation that the sampling needle transfers the blood sample to the blood dripping needle 10 may be performed synchronously with the operation that the blood dripping needle 10 is driven to move from the blood dripping position 01 to the slide 200, that is, the sampling needle transfers the blood sample to the blood dripping needle 10 synchronously when the blood dripping needle 10 moves towards the slide 200, and after the blood dripping needle 10 is in contact with the slide 200, the blood dripping needle 10 just loads the transferred blood sample onto the slide 200. Such cooperation can shorten the total time taken for the sample loading operation of the smear apparatus 300 and improve the working efficiency of the smear apparatus 300.

Referring to FIG. 14 for an embodiment, after the blood sample is loaded onto the slide 200 through the blood dripping needle 10 in S103, the method may further include the following operation.

At S104, the blood dripping needle 10 is driven to reset and is cleaned, and the slide 200 is driven to move to a smear position for smearing.

Specifically, after the sample loading mechanism 100 of the smear apparatus 300 completes a blood sample loading operation, it is required to control the blood dripping needle 10 to reset, and the blood dripping needle 10 is cleaned after or during resetting. The blood dripping needle 10 returns to the blood dripping position 01 and waits for the next blood dripping or sampling operation. At the same time, the smear apparatus 300 sends the slide 200 loaded with the blood sample to the next process for smearing, so as to smear the blood sample on the slide 200 to form a blood film. It is to be understood that the operation of driving the blood dripping needle 10 to return to the blood dripping position 01 may be performed simultaneously with the operation of driving the slide 200 to move to the smear position, so as to improve the working efficiency of the smear apparatus 300.

Figure 15:
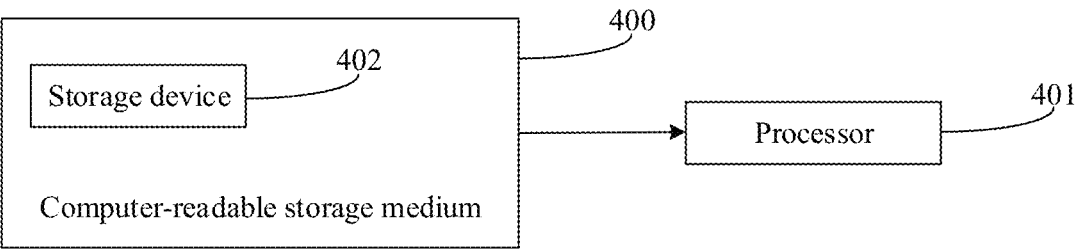
FIG. 15 illustrates a schematic diagram of a computer-readable storage medium according to an embodiment of the disclosure.

Referring to FIG. 15, the disclosure relates to a computer-readable storage medium 400. The computer-readable storage medium 400 includes a processor 401 and a storage device 402. The storage device 402 stores an executable instruction which, when being executed by the processor, causes the processor to implement the above sample loading method for a smear apparatus.

In a specific embodiment, the processor 401 is configured to call program instructions stored in the storage device 402 to perform the following operations.

The blood dripping needle 10 is driven to move towards the slide 200.

The position of the blood dripping needle 10 relative to the slide 200 is detected, and when it is detected that the blood dripping needle 10 is in contact with the slide 200, the blood dripping needle 10 is controlled to stop from moving towards the slide 200.

The blood sample is loaded onto the slide 200 through the blood dripping needle 10.

The storage device 402 may include volatile memories, such as a Random-Access Memory (RAM). The storage device 402 may also include non-volatile memories, such as a flash memory and a Solid-State Drive (SSD). The storage device 402 may also include a combination of the above storage devices.

The processor 401 may be a Central Processing Unit (CPU). The processor 401 may also be other universal processors, Digital Signal Processors (DSPs), Application Specific Integrated Circuits (ASICs) and Field Programmable Gate Arrays (FPGAs) or other programmable logical device, discrete gate or transistor logical device and discrete hardware component. The universal processor may be a microprocessor, or the processor may also be any conventional processor and the like.

In an embodiment, when the processor 401 calls the program instructions stored in the storage device 402 to execute the sample loading method for a smear apparatus, whether the blood dripping needle 10 is in contact with the slide 200 is determined by detecting the pressure received by the blood dripping needle 10 or the slide 200.

In an embodiment, when the processor 401 calls the program instructions stored in the storage device 402 to execute the sample loading method for a smear apparatus, after the blood dripping needle 10 comes into contact with the slide 200, and before the blood dripping needle 10 loads the blood sample onto the slide 200, the blood dripping needle 10 is controlled to move a predetermined distance away from the slide 200.

In an embodiment, when the processor 401 calls the program instructions stored in the storage device 402 to execute the sample loading method for a smear apparatus, the blood dripping needle 10 is driven to move towards the slide 200 in the first direction 001.

Then, when the blood sample is loaded onto the slide 200 through the blood dripping needle 10, the blood sample is loaded onto the slide 200 continuously through the blood dripping needle 10 in the second direction 002, so as to form a continuous blood sample line on the slide 200. The second direction 002 is perpendicular to the first direction 001.

In an embodiment, when the processor 401 calls the program instructions stored in the storage device 402 to execute the sample loading method for a smear apparatus, before the blood dripping needle 10 is driven to move towards the slide 200, the blood dripping needle 10 is driven to move to the blood dripping position 01 after sampling, the blood dripping position 01 being an initial position before the blood dripping needle 10 moves towards the slide 200; or the blood collection needle 3051 is driven to transfer the blood sample to the blood dripping needle 10 at the blood dripping position 01 after sampling.

In an embodiment, when the processor 401 calls the program instructions stored in the storage device 402 to execute the sample loading method for a smear apparatus, after the blood sample is loaded onto the slide 200 through the blood dripping needle 10, the blood dripping needle 10 is driven to reset and is cleaned, and the slide 200 is driven to move to the smear position for smearing.

It is to be noted that the expansion of the embodiments of the smear apparatus 300 in FIG. 8 and FIG. 9, the sample loading method for a smear apparatus in FIG. 10 to FIG. 14 and the computer-readable storage medium 400 in FIG. 15 can refer to the explanation of the corresponding embodiments in the sample loading mechanism 100.

For the sample loading mechanism applicable to the smear apparatus in the disclosure, during the process of driving the blood dripping needle to move relative to the slide by the transfer device, the detection device detects whether the blood dripping needle is in contact with the slide. After it is detected that the blood dripping needle is in contact with the slide, the control device controls the blood dripping needle to let blood drip on the slide, so as to load the blood sample onto the slide. The contact between the blood dripping needle and the slide may facilitate more accurate positioning of the blood dripping needle, thereby facilitating the control of a relative position between the blood dripping needle and the slide in a subsequent blood dripping process. Compared with the related art in which the blood dripping needle is controlled to move to a preset height precisely, the sample loading mechanism of the disclosure has a lower requirement on the control precision, and can adapt to the slides with different thickness to ensure the accuracy of the relative position between the blood dripping needle and the slide.

In the smear apparatus, the sample loading method for the smear apparatus and the computer-readable storage medium according to the disclosure, after it is detected that the blood dripping needle is in contact with the slide, the blood dripping needle is controlled to let blood drip to load sample. Similar to the beneficial effect achieved by the first aspect of the disclosure, the contact between the blood dripping needle and the slide may facilitate more accurate positioning of the blood dripping needle, thereby facilitating the control of a relative position between the blood dripping needle and the slide in a subsequent blood dripping process.

The above description of the embodiments does not intend to limit the scope of protection of the technical solution. Any modifications, equivalent replacements, improvements and the like made within the spirit and principle of the embodiments shall fall within the scope of protection of the technical solution.

The invention claimed is:

1. A smear apparatus, comprising:
a slide loading mechanism, configured to move a slide to the smear apparatus;
a sample loading mechanism, configured to load a blood sample onto the slide;
a smear mechanism, configured to smear the blood sample on the slide to form a blood film;
a drying mechanism, configured to dry the blood film on the slide; and
a staining mechanism, configured to stain the slide;
wherein the sample loading mechanism comprises: a blood dripping needle, a transfer device and a control device; and wherein
the blood dripping needle is connected with the transfer device which is configured to drive the blood dripping needle to move relative to the slide;
when the blood dripping needle is in contact with the slide, the control device is configured to control the transfer device to stop the blood dripping needle from moving towards the slide, and to control the blood dripping needle to drip the blood sample onto the slide.

2. The smear apparatus of claim 1, wherein the sample loading mechanism further comprises a detection device connected with the transfer device communicatively and configured to detect whether the blood dripping needle is in contact with the slide.

3. The smear apparatus of claim 2, wherein the detection device is a pressure detection device configured to determine whether the blood dripping needle is in contact with the slide by detecting a pressure change on the blood dripping needle or the slide.

4. The smear apparatus of claim 3, wherein
the pressure detection device comprises an elastic connection device and a sensing device;
the elastic connection device is connected between a connection end of the blood dripping needle and the transfer device, or between the slide and a base holding the slide; and
the sensing device is configured to sense an elastic deformation of the elastic connection device.

5. The smear apparatus of claim 4, wherein
the elastic connection device is connected between the connection end of the blood dripping needle and the transfer device;
a connection position where the connection end of the blood dripping needle is connected with the elastic connection device is a first connection position; a connection position where the transfer device is connected with the elastic connection device is a second connection position; and
the sensing device is arranged at one of the first connection position and the second connection position, and the other of the first connection position and the second connection position is provided with a triggering component for triggering the sensing device.

6. The smear apparatus of claim 5, wherein the sensing device is an optocoupler sensor, and the triggering component is a baffle used for blocking a detection end of the sensing device.

7. The smear apparatus of claim 4, wherein the elastic connection device is a spring; the transfer device is provided with a first fixing column which is sleeved in one end of the spring; and the connection end of the blood dripping needle is provided with a second fixing column which is sleeved in the other end of the spring, and wherein the first fixing column and the second fixing column are sleeved with each other; or
wherein the transfer device comprises a driving device, a transfer belt and a connecting component, the driving device is configured to drive the transfer belt, and the connecting component is connected between the transfer belt and the connection end of the blood dripping needle.

8. The smear apparatus of claim 4, wherein the blood dripping needle comprises a blood dripping end opposite to the connection end in a first direction, the blood dripping end is provided with a gap extending in a second direction, the gap penetrates at least one side of an outer wall of the blood dripping end from a geometric center of the blood dripping end, and the second direction is perpendicular to the first direction.

9. The smear apparatus of claim 8, wherein the gap runs through the blood dripping end in the second direction.

10. The smear apparatus of claim 8, wherein a hollow area formed on a cross section of the blood dripping end perpendicular to the second direction is a rectangle, trapezoid or arc.

11. The smear apparatus of claim 8, wherein the control device is further configured to control the transfer device to drive the blood dripping needle to move in the second direction and perform a blood dripping operation.

12. The smear apparatus of claim 1, wherein when the blood dripping needle is in contact with the slide, the control device is configured to control the transfer device to stop the blood dripping needle from moving towards the slide, and then the blood dripping needle performs a blood dripping operation;
or, when the blood dripping needle is in contact with the slide, the control device is configured to control the transfer device to drive the blood dripping needle to move away from the slide by a predetermined distance, and then the blood dripping needle performs a blood dripping operation.

13. A smearing method for a smear apparatus, comprising:
moving a slide to the smear apparatus;
loading a blood sample onto the slide;
smearing the blood sample on the slide to form a blood film;
drying the blood film on the slide; and
staining the slide;
wherein loading the blood sample onto the slide comprises:
driving a blood dripping needle to move towards the slide;
when the blood dripping needle is in contact with the slide, controlling the blood dripping needle to stop from moving towards the slide; and
dripping the blood sample onto the slide via the blood dripping needle.

14. The smearing method for the smear apparatus of claim 13, further comprising:
detecting a position of the blood dripping needle relative to the slide, to determine whether the blood dripping needle is in contact with the slide, wherein the detecting the position of the blood dripping needle relative to the slide comprises:
determining whether the blood dripping needle is in contact with the slide by detecting a pressure on the blood dripping needle or the slide.

15. The smearing method for the smear apparatus of claim 13, wherein after the blood dripping needle is in contact with the slide, and before the blood dripping needle drips the blood sample onto the slide, the method further comprises:

controlling the blood dripping needle to move away from the slide by a predetermined distance.

16. The sample leading smearing method for the smear apparatus of claim 13, wherein the driving the blood dripping needle to move towards the slide comprises: driving the blood dripping needle to move towards the slide in a first direction; and the dripping the blood sample onto the slide via the blood dripping needle comprises: dripping the blood sample onto the slide continuously via the blood dripping needle in a second direction, to form a continuous blood sample line on the slide, the second direction being perpendicular to the first direction.

17. The smearing method for the smear apparatus of claim 13, wherein before driving the blood dripping needle to move towards the slide, the method further comprises:

driving the blood dripping needle to move to a blood dripping position, wherein the blood dripping position is an initial position before the blood dripping needle moves towards the slide; or driving a blood collection needle to transfer the blood sample to the blood dripping needle at the blood dripping position;

and/or wherein after dripping the blood sample onto the slide via the blood dripping needle, the method further comprises:

driving the blood dripping needle to reset and cleaning the blood dripping needle, and driving the slide to move to a smear position for smearing.

18. The smear apparatus of claim 1, wherein the blood dripping needle comprises a flat blood dripping end, and the flat blood dripping end is provided with a gap extending in a second direction perpendicular to an axial direction of the blood dripping needle.

19. The smear apparatus of claim 18, wherein a width of the gap is substantially same as or greater than an inner diameter of the blood dripping needle.

20. The smear apparatus of claim 18, wherein the smear mechanism is further configured to smear the blood sample output from the flat blood dripping end, including the blood sample flowed through the gap in the second direction, onto the slide in a direction perpendicular to the second direction.

\* \* \* \* \*